(12) United States Patent
Grodsky et al.

(10) Patent No.: US 9,250,834 B2
(45) Date of Patent: Feb. 2, 2016

(54) METHOD AND APPARATUS FOR READING AND REPLACING CONTROL AND/OR IDENTIFICATION DATA IN A PRINT IMAGE TO SUPPORT DOCUMENT TRACKING, FLOW CONTROL, AND SECURITY

(75) Inventors: Gilbert Alan Grodsky, Burbank, CA (US); Richard Thomas Horn, Claremont, CA (US)

(73) Assignee: Xerox Corporation, Norwalk, CT (US)

( * ) Notice: Subject to any disclaimer, the term of this patent is extended or adjusted under 35 U.S.C. 154(b) by 764 days.

(21) Appl. No.: 12/957,869

(22) Filed: Dec. 1, 2010

(65) Prior Publication Data

US 2012/0140251 A1   Jun. 7, 2012

(51) Int. Cl.
| | | |
|---|---|---|
| G06F 15/00 | (2006.01) | |
| G06F 3/12 | (2006.01) | |
| H04N 1/32 | (2006.01) | |

(52) U.S. Cl.
CPC ............ *G06F 3/1206* (2013.01); *G06F 3/1208* (2013.01); *G06F 3/1247* (2013.01); *G06F 3/1285* (2013.01); *H04N 1/32144* (2013.01); *G06F 3/1275* (2013.01); *H04N 2201/323* (2013.01); *H04N 2201/3233* (2013.01); *H04N 2201/3269* (2013.01)

(58) Field of Classification Search
None
See application file for complete search history.

(56) References Cited

U.S. PATENT DOCUMENTS

| | | | |
|---|---|---|---|
| 6,020,972 A | 2/2000 | Mahoney et al. | |
| 6,888,647 B2 * | 5/2005 | Housel | 358/1.9 |
| 7,576,753 B2 | 8/2009 | Saund et al. | |
| 2002/0076103 A1 | 6/2002 | Lin et al. | |
| 2003/0033432 A1 * | 2/2003 | Simpson et al. | 709/246 |
| 2003/0164978 A1 * | 9/2003 | Song | 358/1.18 |
| 2004/0086156 A1 * | 5/2004 | Furukawa et al. | 382/112 |
| 2004/0186801 A1 * | 9/2004 | Morita | 705/32 |
| 2007/0177761 A1 * | 8/2007 | Levy | 382/100 |
| 2008/0037048 A1 * | 2/2008 | Hopper et al. | 358/1.13 |
| 2008/0130044 A1 * | 6/2008 | Yamada | 358/1.15 |
| 2008/0279474 A1 | 11/2008 | Venable et al. | |
| 2008/0309962 A1 | 12/2008 | Smith | |
| 2009/0002726 A1 | 1/2009 | Osadciw | |
| 2009/0237681 A1 * | 9/2009 | Ferlitsch | |
| 2009/0244620 A1 * | 10/2009 | Takahashi et al. | 358/1.15 |
| 2010/0103444 A1 | 4/2010 | Farrell et al. | |
| 2010/0195158 A1 | 8/2010 | Wen et al. | |

* cited by examiner

*Primary Examiner* — John Wallace
(74) *Attorney, Agent, or Firm* — Ronald E. Prass, Jr.; Prass LLP (57) ABSTRACT

According to aspects of the embodiments, there is provided methods of decomposing and modifying a bitmap image before it is rendered by an output device. Segments of a print image are determined by an aptly programmed processor. In a bitmap driver process, dimensions and location of an area on each print image is processed so as to form objects that can be deleted, modified, or replaced. The process allows for the addition of objects such as tracking or security and the processing of objects to interpret the data found, remove it, and possibly replace it with data based on what was read. These modified objects are embedded in the output bitmap image without increasing its size by reusing dimensions and location of selected areas of the print image.

16 Claims, 7 Drawing Sheets

METHOD AND APPARATUS FOR READING AND REPLACING CONTROL AND/OR IDENTIFICATION DATA IN A PRINT IMAGE TO SUPPORT DOCUMENT TRACKING, FLOW CONTROL, AND SECURITY

BACKGROUND

Disclosed herein are methods for digital document processing, and in particular to such methods that modifies on demand special information in a raster image, as well as corresponding apparatus and computer-readable medium.

A raster image processor (RIP) provides output data in a format that is suitable for rendering by an output device such as a printer. One suitable format is raw, binary dot patterns forming a bitmap. Rendering by the output device may include printing by a printer, and displaying on a screen. The raster image processor receives input of one or more page descriptions. The page descriptions includes information about fonts, graphics, and the like that describe the appearance of each page. The page descriptions may be in a high level language or even another bitmap of higher or lower resolution than the output device. Some examples of high level page description languages are PostScript (PS), Portable Document Format (PDF) and Extensible Markup Language (XML) Paper Specification (XPS). The raster image processor may be implemented as software, firmware, and/or hardware. Typically, the raster image processor resides in a digital front end (DFE). The raster image processor performs raster image processing (RIPping). Raster image processing is the process of translating the page descriptions into a RIPped image or into a bitmap for output by the output device like desktop printer. Raster formats include: TIFF (Tagged-Image File Format),PSD (Photoshop Document),EPS (Encapsulated PostScript),JPEG (Joint Photographic Experts Group), PNG (Portable Network Graphics),GIF (Graphics Interchange Format),BMP (Windows Bitmap),EMF (Enhanced MetaFile), EPS (Encapsulated PostScript),PDF (Portable Document Format),PS (PostScript),PGM (Portable Gray Map), PPM (portable pixel map),PBM (portable bit map), EXIF (Exchangeable image file format),RAW (raw image format),SVG (Scalable Vector Graphics), CGM (Computer Graphics Metafile),XBM (X BitMap),ILBM (InterLeaved BitMap),WMP (Windows Media Photo),WBMP (Wireless Bit-Map or Wireless Application Protocol Bitmap Format), PNM (Portable Bitmap).

Printed documents often require additional information in the form of symbolic encodings or marks to provide additional data about the document that may or may not have anything to do with the content of the document. For example, the information can be tracking data, workflow information such as creator and device used for creating the document, and/or even security designations. This data might even be instructions for further processing such as finishing, packing, or routing that need to be read further down line in the process.

As the number of applications grows so do the number of additional marks that need to be added to the output image of the document to be printed. These marks can become distracting or even unattractive. Current attempts to solve this growing problem have included data compression in the symbols used or different toners for marking that may be harder to see by the normal eye. One major drawback that these approaches have is they don't have the capability to change the special information on demand. An example would be a document which is marked with printing tracking information that is subsequently changed. In the current print process it is difficult to alter the page content so such a document would have to be processed offline to accommodate the post marking changes.

SUMMARY

According to aspects of the embodiments, there is provided methods of decomposing and modifying a bitmap image before it is rendered by an output device. Segments of a print image are determined by an aptly programmed processor. In a bitmap driver process, dimensions and location of an area on each print image is processed so as to form objects that can be deleted, modified, or replaced. The process allows for the addition of objects such as tracking or security and the processing of objects to interpret the data found, remove it, and possibly replace it with data based on what was read. These modified objects are embedded in the output bitmap image without increasing its size by reusing dimensions and location of selected areas of the print image.

DETAILED DESCRIPTION

Aspects of the embodiments disclosed herein relate to methods for decomposing and modifying a bitmap image before it is rendered by an output device, and corresponding apparatus and computer readable medium. The disclosed embodiments allow a user to decode information from a bitmap of a page that was about to be printed and to alter the page content according to the extracted information.

The disclosed embodiments include methods to manage at least one RIPped image during job workflow before printing by performing the steps of sensing whether a modification of the at least one RIPped image has been selected; and if it is sensed that a modification of the at least one RIPped image has been selected, extracting information from the at least one RIPped image.

In another aspect, the disclosed embodiment is to a method to manage at least one RIPped image during job workflow wherein the modification is selected from a group comprising of deleting extracted information, deleting extracted information and adding additional information, adding additional information, embedding a control instruction in the at least one RIPped image.

In another aspect, the disclosed embodiment is a method to manage at least one RIPped image during job workflow further comprising forming an output bitmap image after modification of the at least one RIPped image.

In another aspect, the disclosed embodiment is to a method to manage at least one RIPped image during job workflow wherein the output bitmap image has a format compatible with one of TIFF, JPEG, PNG, BMP, EXIF, and WMP.

In another aspect, the disclosed embodiment is to a method to manage at least one RIPped image during job workflow wherein adding additional information is selected from a group comprising of operator identification (ID) information, printer identification (ID) information, time stamp information, watermark, tracking information, security feature and other information of value to the producer or consumer of the document.

The disclosed embodiments further include a print server for implementation by at least one machine for processing a job workflow, the print workflow server comprising a processor to execute instructions for processing the job workflow and to sense whether a modification of at least one RIPped image in a print job has been selected; and an interface to connect to the print workflow server so as to receive a modification print instruction; wherein the modification print instruction causes the processor to extract information from the at least one RIPped image and to modify the at least one RIPped image.

The disclosed embodiments further include an apparatus for controlling print processing of a document having at least one RIPped image, comprising a processor; and a storage device coupled to the processor, wherein the storage device contains instructions operative on the processor for: displaying a print user interface with at least one selectable print modification instruction; sensing selection of the at least one selectable print modification instruction; extracting information from the at least one RIPped image if it is sensed that a selection of the at least one selectable print modification instruction has been made; and applying the at least one selectable print modification instruction to the document.

The term "print engine" as used herein refers to a digital copier or printer, image printing machine, digital production press, document processing system, image reproduction machine, bookmaking machine, facsimile machine, multifunction machine, display system, or the like and can include several marking engines, feed mechanism, scanning assembly as well as other print media processing units, such as paper feeders, finishers, and the like.

The term "print media" generally refers to a usually flexible, sometimes curled, physical sheet of paper, plastic, or other suitable physical print media substrate for images, whether precut or web fed. For the purposes of this document, the term is expanded to include display devices.

Figure 1:
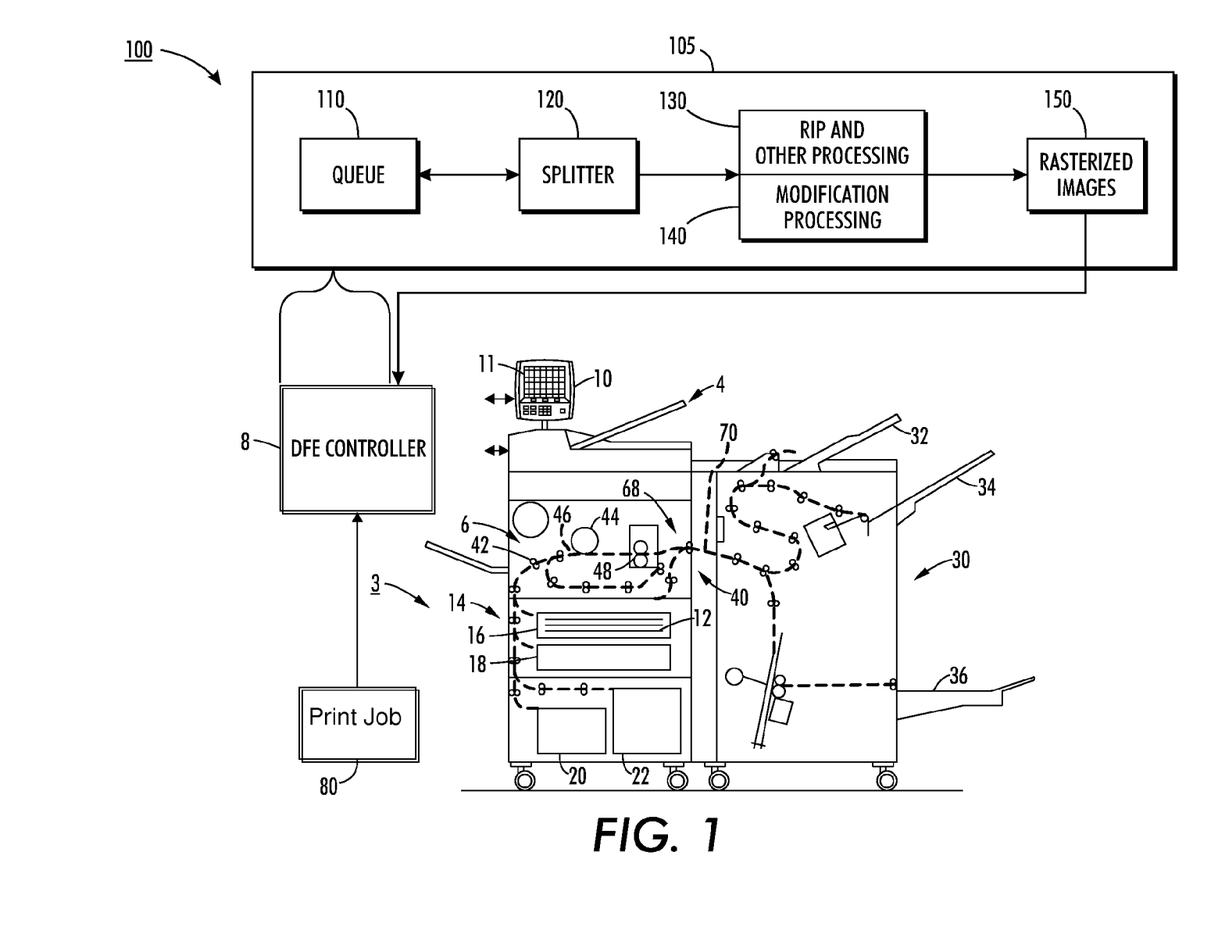
FIG. 1 illustrates a block diagram of a document processing system with modification processing to replace control and/or identification data in a print image in accordance to an embodiment.

FIG. 1 illustrates a block diagram of a document processing system 100 with modification processing to replace control and/or identification data in a print image in accordance to an embodiment. The document processing system 100 can be any form of commercial printing apparatus, copier, printer, facsimile machine, or other system which may include a scanner or other input device 4 that scans an original document text and/or images to create an image comprising pixel values indicative of the colors and/or brightness of areas of the scanned original, or receives images such as in a print job 80, and which has at least one marking engine or print engine 6 by which visual images, graphics, text, etc. are printed on a page or other printable medium, including xerographic, electro photographic, and other types of printing technology, wherein such components are not specifically illustrated in FIG. 1 to avoid obscuring the various aspects of the present disclosure. The print engine 6 in the system of FIG. 1 may be any device or marking apparatus for applying an image from a digital front end (DFE) printer job controller 8 to printable media (print media) such as a physical sheet of paper, plastic, or other suitable physical media substrate for images, whether precut or web fed, or a display device, where the input device 4, print engine 6, and controller 8 are interconnected by wired and/or wireless links for transfer of electronic data therebetween, including but not limited to telephone lines, computer cables, ISDN lines, and the like. The print engine 6 generally includes hardware and software elements employed in the creation of desired images by electrophotographic processes wherein suitable print engines 6 may also include ink-jet printers, such as solid ink printers, thermal head printers that are used in conjunction with heat sensitive paper, and other devices capable of printing or marking an image on a printable media. The digital front end controller 8 has job processor 105 hardware comprising a queue 110, splitter 120, RIP processor 130, modification processor 140, and rasterizer 150 to convert a print job 80 a one or more print images. The print image or digitized document is completely or partially formatted as an image file. Image files include either pixel or vector (geometric) data that are rasterized to pixels when displayed. Raster formats include: JPEG, TIFF, RAW, PNG, GIF, BMP, PPM, PGM, PBM, XBM, ILBM, WBMP, and PNM. Vector formats include: CGM, and SVG. The print image may be produced at any resolution creating the final printed document and may include document security features to prevent counterfeiting of documents and unauthorized duplication.

The image input device 4 may include or be operatively coupled with conversion components for converting the image-bearing documents to image signals or pixels or such function may be assumed by the printing engine 6 or by a stand alone scanner. The system 2 includes an integral user interface 10 with a display 11 and suitable operator/user controls such as buttons, touch screen, and the like. The DFE printer controller 8 provides the output pixel data from memory to a print engine 6 that is fed with a print media sheets 12 from a feeding source 14 such as a paper feeder which can have one or more print media sources or paper trays 16, 18, 20, 22, each storing sheets of the same or different types of print media 12 on which the marking engine 6 can print. The exemplary print engine 6 includes an imaging component 44 and an associated fuser 48, which may be of any suitable form or type, and may include further components which are omitted from the figure so as not to obscure the various aspects of the present disclosure. In one example, the print engine 6 may include a photoconductive insulating member or photoreceptor which is charged to a uniform potential and exposed to a light image of an original document to be reproduced via an imaging laser under control of a controller of the DFE 8, where the exposure discharges the photoconductive insulating surface of the photoreceptor in exposed or background areas and creates an electrostatic latent image on the photoreceptor corresponding to image areas of the original document. The electrostatic latent image on the photoreceptor is made visible by developing the image with an imaging material such as a developing powder comprising toner particles via a development unit, and the customer image is then transferred to the print media 12 and permanently affixed thereto in the fusing process.

In a multicolor electrophotographic process, successive latent images corresponding to different colors can be formed on the photoreceptor and developed with a respective toner of a complementary color, with each color toner image being successively transferred to the paper sheet 12 in superimposed registration with the prior toner image to create a multilayered toner image on the printed media 12, and where the superimposed images may be fused contemporaneously, in a single fusing process. The fuser 48 receives the imaged print media from the image-forming component and fixes the toner image transferred to the surface of the print media 12, where the fuser 48 can be of any suitable type, and may include fusers which apply heat or both heat and pressure to an image. Printed media from the printing engine 6 is delivered to a finisher 30 including one or more finishing output destinations 32, 34, 36 such as trays, stackers, pans, and the like. A print media transporting system or network or highway 40 of the document processing system 2 links the print media source 14, the print engine 6, and the finisher 30 via a network of flexible automatically feeding and collecting drive members, such as pairs of rollers 42, spherical nips, air jets, or the like, along with various motors for the drive members, belts, guide rods, frames, and the like (not shown), which, in combination with the drive members, serve to convey the print media 12 along selected pathways at selected speeds. Print media 12 is thus delivered from the source 14 to the print engine 6 via a pathway 46 common to the input trays 16, 18, 20, 22, and is printed by the imaging component 44 and fused by the fuser 48, with a pathway 46 from the print engine 6 merging into a pathway 70 which conveys the printed media 12 to the finisher 30, where the pathways 46, 48, 70 of the network 40 may include inverters, reverters, interposers, bypass pathways, and the like as known in the art. In addition, the print engine 6 may be configured for duplex or simplex printing and a single sheet of paper 12 may be marked by two or more print engines 6 or may be marked a plurality of times by the same marking engine 6, for instance, using internal duplex pathways (not shown).

The document processing system 100 is operative to perform these scanning and printing tasks in the execution of print jobs 80, which can include printing selected text, line graphics, images, machine ink character recognition (MICR) notation, and the like, on either or both of the front and back sides or pages of one or more media sheets 12. An original document or image or print job or jobs 80 can be supplied to the document processing system 100 in various ways. In one example, the built-in optical scanner 4 may be used to scan an original document such as book pages, a stack of printed pages, or so forth, to create a digital image of the scanned document that is reproduced by printing operations performed by the document processing system 100 via the print engine 6. Alternatively, the print jobs 80 can be electronically delivered to the system controller via a memory stick, network, or other well know communication means, for instance, whereby a network user can print a document from word processing software running on a network computer such as desktop computer 402 shown in FIG. 4 thereby generating an input print job 80. The print engine 6, the DFE 8, and the finishing station 30 in the illustrated example are part of a printing machine 3, wherein a splitter 120 is implemented in the exemplary DFE 8, and another splitter (not shown) is implemented in the networked computer, although the splitter can be implemented in any suitable host to generate chunk files for subsequent RIP processing 130 and the specific location of the splitter is not a strict requirement of the present disclosure. Further, the printing machine 3 is operatively coupled to a digital network (not shown) via a digital connection and terminals may be connected to the digital network to use resources at printer 3. A digital network may of any suitable form or type, including without limitation Ethernet, fiber optic, wireless, Bluetooth, or any combination thereof, and the terminals should include a capability of sending a print job 80 and/or chunk files 3 via the digital network to the printing machine 3.

Figure 4:
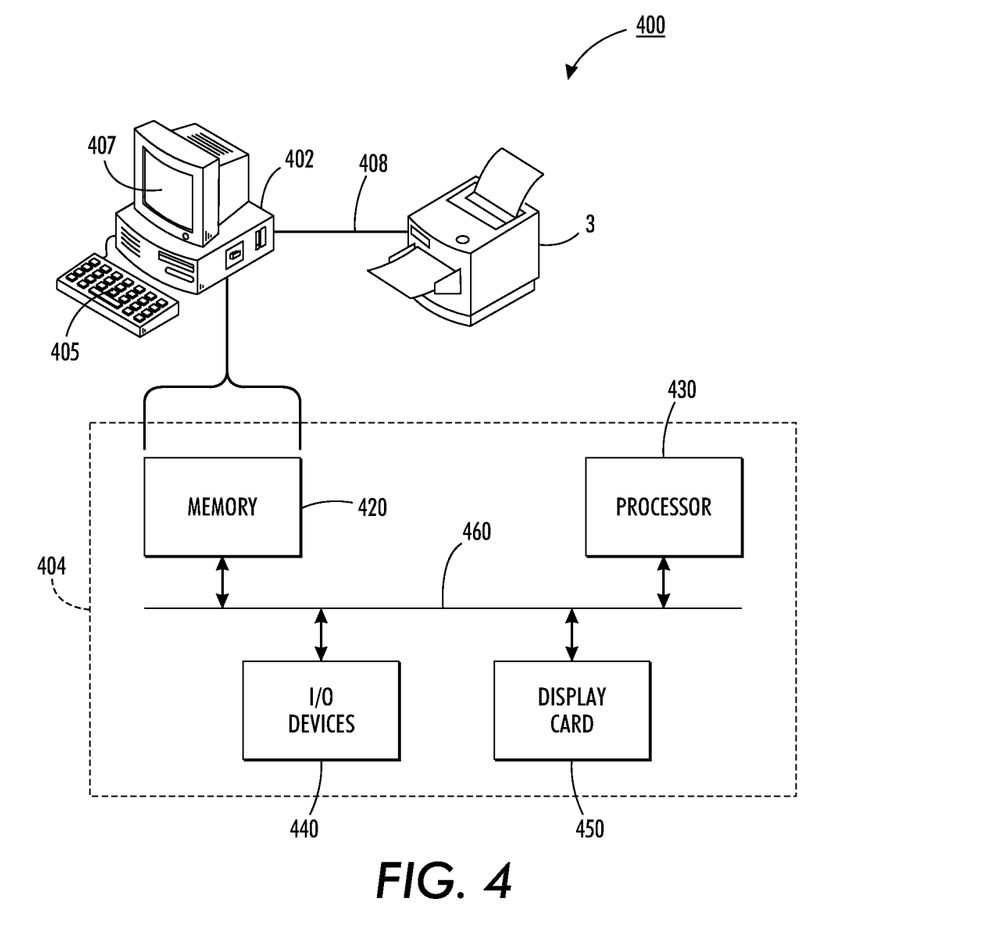
FIG. 4 illustrates a block diagram of a system for implementing modification processing and for controlling a printer in accordance to an embodiment.

The splitter 120 any component thereof, whether implemented in the DFE controller 8 or in a desktop computer 402 operatively associated with the document processing system 100, may be any suitable hardware, software, firmware, logic, or combinations thereof that are adapted, programmed, or otherwise configured to implement the functions illustrated and described herein, and may be embodied as computer-executable instructions of a computer-readable media, such as in memory of the desktop computer 402, the DFE 8, or other memory storage media operatively coupled with a computer for execution of such instructions. For example, the controller 8 and the splitter 120 in certain embodiments may be implemented, in whole or in part, as software components and may be implemented as a set of sub-components or objects including computer-executable instructions of a memory, disk, or other computer-readable media that can be executing on one or more hardware platforms such as one or more computers including one or more processors, data stores, memory, and the like of the document processing system 100, or the splitter 120 may be computer-executable instructions executing in one or computers. The splitter 120, moreover and components thereof, may be executed on the same computer or processor, or may be implemented in distributed fashion in two or more processing components that are operatively coupled with one another to provide the functionality and operation described herein.

Job processor 105 receives incoming print jobs 80 via a queue 110 from one or computers or from scanning done at the document processing system 100. The queue 110 may be a single queue or multiple queues. Both queues may be implemented as indexes into one queue. Alternatively a job in the print queue may simply have a held status without there actually being a hold queue. The digital front end 8 may include additional queues. Typically, the system controller assigns jobs from clients to the queue 110 and the operator schedules and releases jobs to a print queue like queue 110. When a job is released to the print queue, the system controller passes the released job to the raster image processor or modification processor 140 for modification and/or raster image processing. A splitter 120 receives the print job file, such as a PDL file and the like, and from this constructs a plurality of chunk files for subsequent RIP and other processing 130. A modification processor 140 provides a user interface, FIG. 6 and FIG. 7, at whatever level is most appropriate for the architecture of the DFE. In a Xerox Free Flow Print Server which is herein incorporated by reference in its entirety, the most appropriate place is the queue level. Within a queue the user can select dimensions and location of an area on each print image that will be processed. In an already RIPped image the user will have the option to interpret the data found, remove it, and possibly replace it with data based on what was read. Once each page image is processed it is passed on to the printer via RIP and other processing 130. After being RIP processed by a raster image processing component a print-ready rasterized images 150 that can be stored and/or printed or otherwise rendered at print engine 6.

Figure 2:
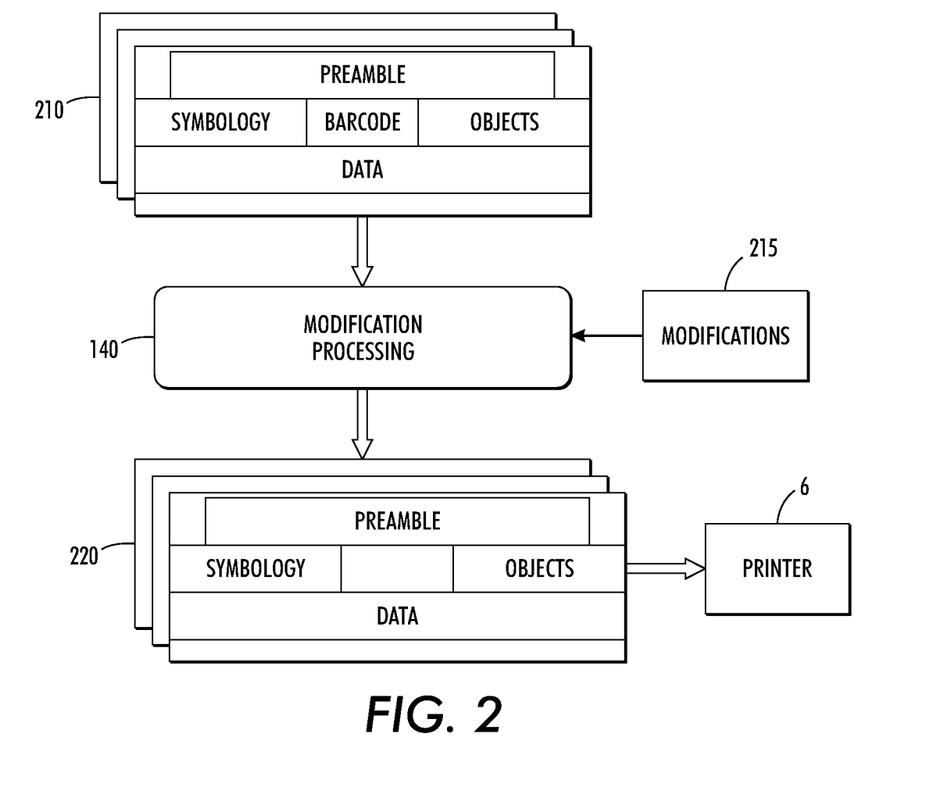
FIG. 2 illustrates a RIPped image before and after modification processing in accordance to an embodiment.

FIG. 2 illustrates a RIPped image before and after modification processing in accordance to an embodiment. One of the processing functions performed by the DFE 8 or any aptly programmed processor is known as raster image processing (RIP) in which a document description is transformed into an image that can be printed by a marking engine. This image is know as a RIPped image or a bitmap image and is essentially a two dimensional pattern of pixels that the marking engine like print engine 6 can directly print whereas the document description can contain text and graphics. The RIPped image 210 may include data representing not only the image data itself, but data representing the location, shape, or orientation of the object, or some combination thereof. It will be understood by one skilled in the art that a RIPped image may be readily converted into or derived from other electronic image formats, including, but not limited to, JPEG, PDF and TIFF and similar images. RIPped image 210 includes a preamble, one or more resources (e.g., fonts, forms, XObjects, images, and the like), and "i" page portions, where "I" is an integer greater than 1, with only one exemplary page portions being illustrated. The various portions of the RIPped image 210 may be anywhere within the file, for example, where the resources may be separate from the preamble, or may be integrated into the preamble. Each page portion of the RIPped image 210 includes corresponding page data, and one or more of the page portions includes at least one resource reference. Other objects in the RIPped image 210 can comprise data encoding techniques, including 1D and 2D barcodes, magnetic ink character recognition (MICR), optical character recognition (OCR), optical mark recognition (OMR), data glyphs, user defined barcode, a glyph, text, an image, coded symbology, and other user defined information. As the number of applications grows that can make good use of the data, so do the number of additional marks that need to be added to the RIPped image 210. These can become distracting or even unattractive. Having the ability to interpret the data found, remove it, and possibly replace it with data based on what was read would solve the problem of increased marks on the RIPped image 210. For example, a barcode in the image could be read and then deleted from the bitmap image. With this approach, jobs printed with this technology have obtrusive barcode or other symbology removed. Modification processor 140 would solve the need in the art for modification 215 of a bitmap image before it is rendered by print engine 6. Further symbology associated with RIPped image 210 can be erased and optionally replaced with "clear" or matching background. Non-modifying printers, printing the same job stream, will have the ability to read the original barcode or other symbology directly from the printed paper, and act upon it, but of course it will be past the point of keeping it from being printed. Modified RIPped image 220 is produced after the RIPped image 210 after it is processed by modification processor 140. A modification can include applying a security feature (adding) to limit printing to a particular printer to safeguard printing documents of value such as checks. A modification can include inserting tracking information, such as operator ID, Printer serial number and timestamp on each page. A modification can be used to "VOID" selected documents as part of a last minute change. With this approach, the print stream would not have to be re-generated if there was a last minute deletion. A modification can be deleting, and deleting with replacing information read from the decomposed RIPped image 210. A typical anticipated use would be to maintain a log of printed pages, where the log information is the data that is extracted from the image and then erased.

Figure 3:
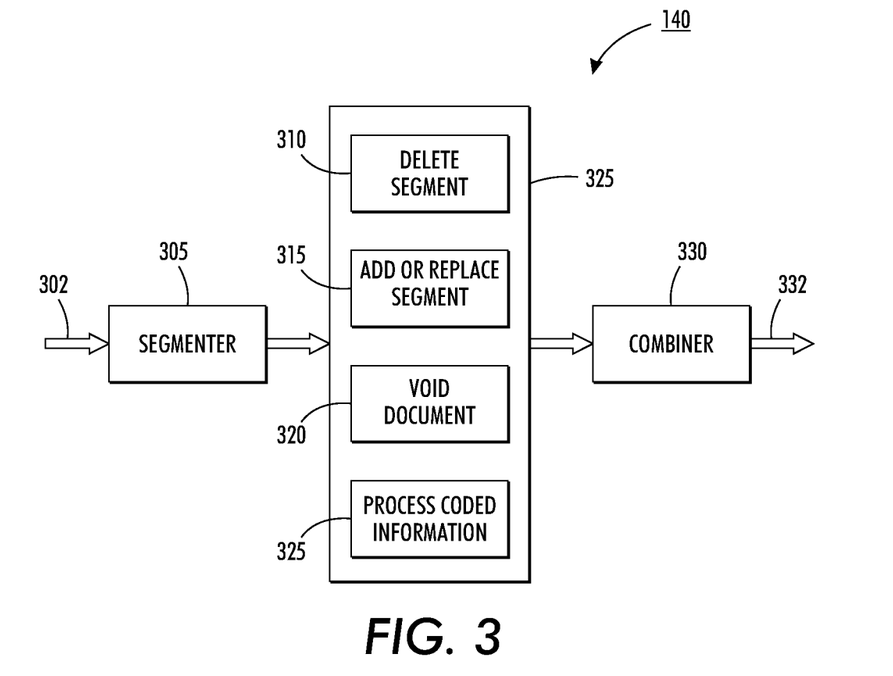
FIG. 3 illustrates a block diagram of a modification processor in accordance to an embodiment.

FIG. 3 illustrates a block diagram of a modification processor 140 in accordance with an embodiment. It should be noted that while shown as a block diagram the functions performed by these blocks can be performed by program modules or by a combination of hardware and software. A bitmap image such as RIPped image 210 is received from a source such as a scanner and is decomposed by a segmenter 305 creating chunks that can be eliminated or edited, added to, or processed by a modification circuit 307. Modification circuit perform such functions as delete segment 310, add or replace segment 315, void document 320, or process coded information 325 such as conditional control information for further processing. After modification functions are performed by the modification circuit 307 a combiner 330 combines the remaining chunks and the added chunks into a file 332 such as a bitmap image that is suitable for printing by print engine 6. The function of segmenting, as performed by the segmenter, is using OCR or other applicable mechanisms to interpret specific character/numerical fields independent of print stream format. With respect to the operation of segmenter 305, any blocked or object based technique that decomposes an image using segmentation approaches into separate image objects on a foreground and background plane that can be viewed separately or as a composite with the other layer or layers. In the preferred embodiment a mixed Raster Content (MRC) representation output is produced by segmenter 305. A segmentation technique that produces a layered output is illustrated in U.S. Pat. No. 6,941,014 to Lin et al. (issued Sep. 6, 2005) entitled "Method and apparatus for segmenting an image using a combination of image segmentation techniques" commonly assigned and incorporated herein by reference. As illustrated the RIPped image 210 is received 302 by a segmenter 305 system or processor 430. The segmenter initially decomposes the individual pages in the RIPped image 210 into digital bitmaps. The digital bitmaps (pages) are then segmented into individual components or objects to extract the information contained therein. The segmenter 305 subsystem or module may include an image processing module to process the bitmap. Examples of such processes are anti-aliasing, edge enhancement, de-skewing, pattern recognition, and the like. The segmenter 305 identifies at least the position, shape and orientation angle of each object in the RIPped image 210. The extracted information from the RIPped image is then processed and information is added or deleted from the segmented RIPped image 210.

FIG. 4 illustrates a block diagram of a system 400 for implementing modification processing and for controlling a printer 3 in accordance to an embodiment. The system 400 includes a computer 402, which includes the elements of processing system 404, including the memory 420, the processor 430, I/O devices 440 and a display card 450. The computer 402 could be a standard personal computer, or could be another type of computing device such as a handheld computer, a phone, a laptop computer, and the like.

The system 400 may also include a keyboard 405 functioning as an input device. The keyboard may be replaced or supplemented by the input devices as illustrated in FIG. 1, for example.

The system 400 may also include a display 407 functioning as an output device for displaying images generated or received by the computer 402. The display 407 may display images to be viewed by a user, such as various application programs, a user interface (UI), text, photographic images, and the like. For example, the display may generate a user interface in response to a print server stored in memory 440, such as a user interface for the print server. The print server could also be stored in a memory in a network that the computer 402 is connected to, such as in a network server.

The system 400 may have a printer 3 connected thereto for printing data such as images, text, and the like. In response to a user directing the computer 402 to print, for example. In response to such a print command, the processor will typically cause the processing system 404 to communicate 408 with the printer to perform the needed printing.

The system 400 may be connected to a network, such as such as an intranet, the Internet, a wireless network, and the like. In addition, the system 400 may be connected to a plurality of printers such as printer 3. The plurality of printers may be of a same printer type or of varying printer types.

The processing system 404 may include at least one conventional processor 430 or microprocessor that interprets and executes instructions. The processor 430 may be a general purpose processor or a special purpose integrated circuit, such as an ASIC, and may include more than one processor section. Additionally, the system 440 may include a plurality of processors 430.

Memory 420 may be a random access memory (RAM) or another type of dynamic storage device that stores information and instructions for execution by processor 430. Memory 420 may also include a read-only memory (ROM) which may include a conventional ROM device or another type of static storage device that stores static information and instructions for processor 430. The memory 420 may be any memory device that stores data for use by system 440.

Input/output devices 440 (I/O devices) may include one or more conventional input mechanisms that permit a user to input information to the system 440, such as a microphone, touchpad, keypad, keyboard, mouse, pen, stylus, voice recognition device, buttons, and the like, and output mechanisms such as one or more conventional mechanisms that output information to the user, including a display, one or more speakers, a storage medium, such as a memory, magnetic or optical disk, disk drive, a printer device, and the like, and/or interfaces for the above. The display card 450 may drive an LCD or CRT display as used on many conventional computing devices, or any other type of display device.

The system 440 may perform functions in response to processor 430 by executing sequences of instructions or instruction sets contained in a computer-readable medium, such as, for example, memory 420. Such instructions may be read into memory 420 from another computer-readable medium, such as a storage device, or from a separate device via a communication interface, or may be downloaded from an external source such as the Internet. The system 400 may be a stand-alone system, such as a personal computer, or may be connected to a network such as an intranet, the Internet, and the like. Other elements may be included with the system 400 as needed.

The memory 420 may store instructions that may be executed by the processor to perform various functions. For example, the memory may store s instructions operative on the processor to display a print user interface with at least one selectable print modification instruction; to sense selection of the at least one selectable print modification instruction; to extract information from the at least one RIPped image if it is sensed that a selection of the at least one selectable print modification instruction has been made; and to apply the at least one selectable print modification instruction to the document having at least one RIPped image.

Figure 5:
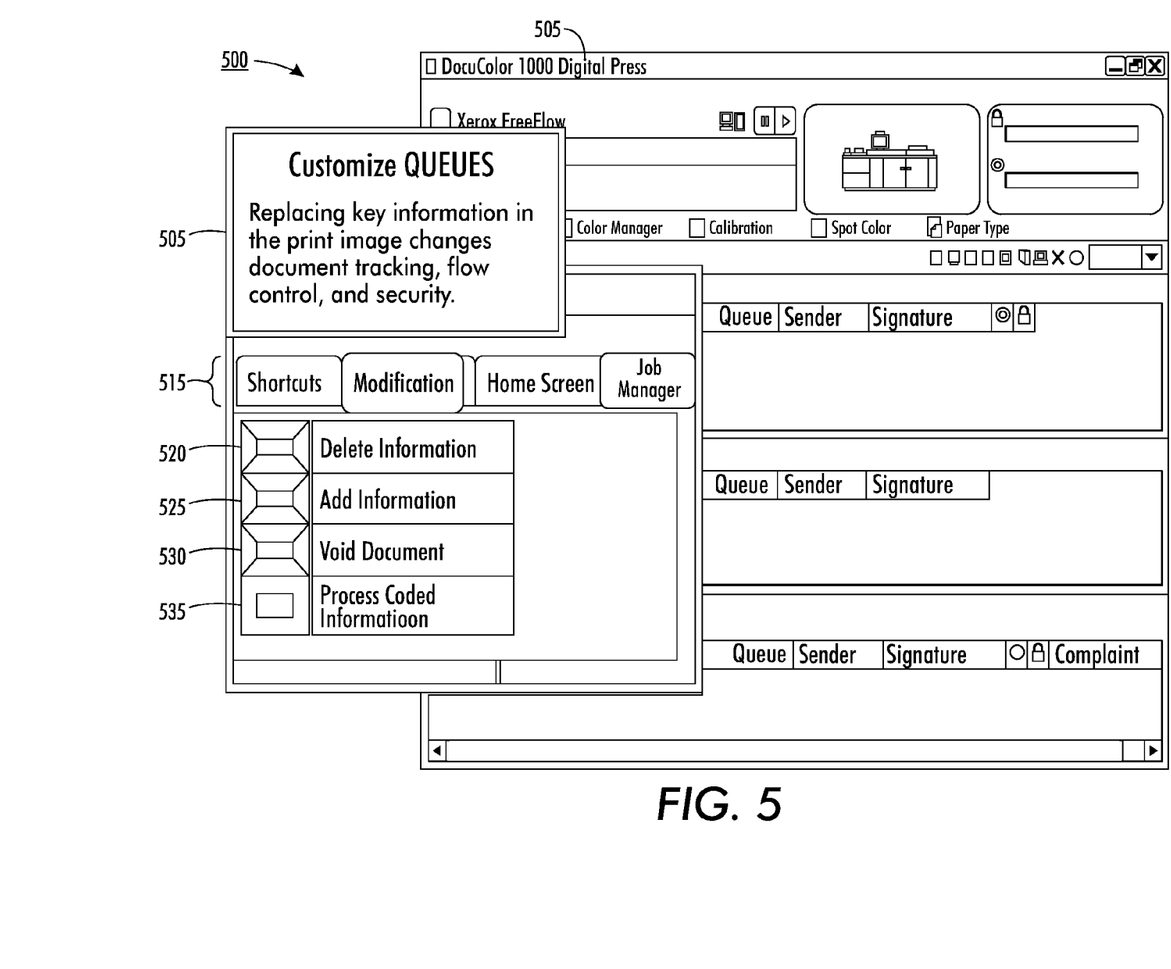
FIG. 5 illustrates a diagram of a modification processing user interface in accordance to an embodiment.

FIG. 5 illustrates a diagram of a modification processing user interface 500 in accordance to an embodiment. The user interface 505 may be invoked and displayed when a user selects a print function on the computer 402 or when using document processing system 100, typically using an input device such as keyboard 405, for example.

The user may typically select a printer in the printer selection area based on the operating system. The user will typically be able to select from all printers for which appropriate drivers have been loaded into memory of the computer 402 that can support Xerox Free Flow Print Server with modification processing. Selecting modifications 505 at the queue level invokes a further printer user interface 510 as illustrated herein. The second interface would give the user the ability to select categorical menus 515 such as shortcuts, modification, home screen, and job manager. Selection of the modification categorical menu provides the user with choices like delete information 520, add information 525, void document 530, and process coded information 535. Selecting any of the user selectable modifications would then invoke other menus and interfaces that would give the user an ability to indicate which of the segments to modify by deleting or adding material. The user interfaces 505 and 510 are example interfaces, and other print user interfaces may be used.

Figure 6:
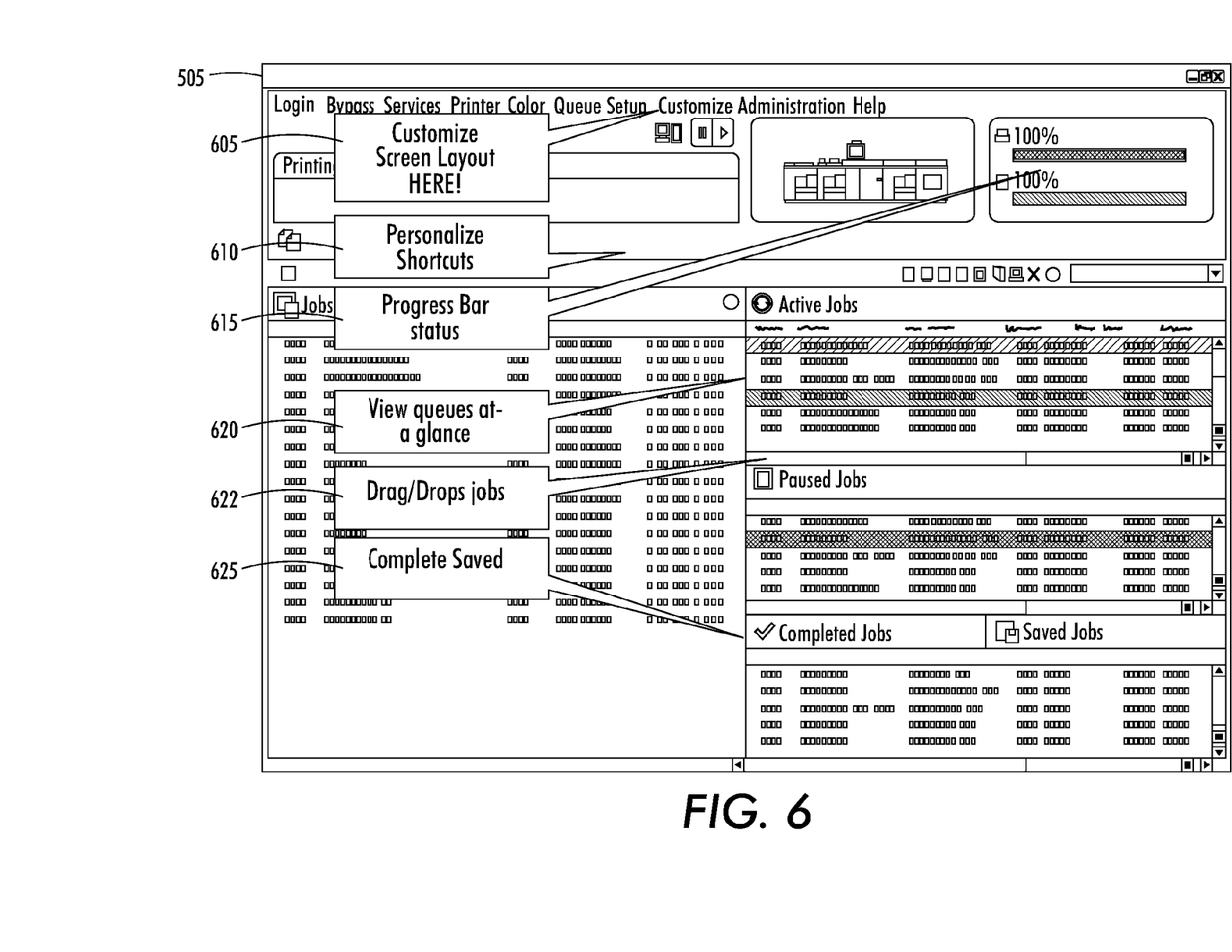
FIG. 6 illustrates a diagram of a print server interface that incorporates modification processing in accordance to an embodiment.

FIG. 6 illustrates a diagram of a print server interface that incorporates modification processing in accordance to an embodiment. The print server interface 505 shows a drop down menu to customize screen layout 605, personalize shortcuts 610, and progress bar status 615. The print server interface 505 also provides individual panes that show the queues at a glance 620, drag/drop jobs 622, and completed/saved 625 print jobs. The user is able to select from the pane of the queues at a glance 620 individual print jobs that are to be subjected to modification processing.

Figure 7:
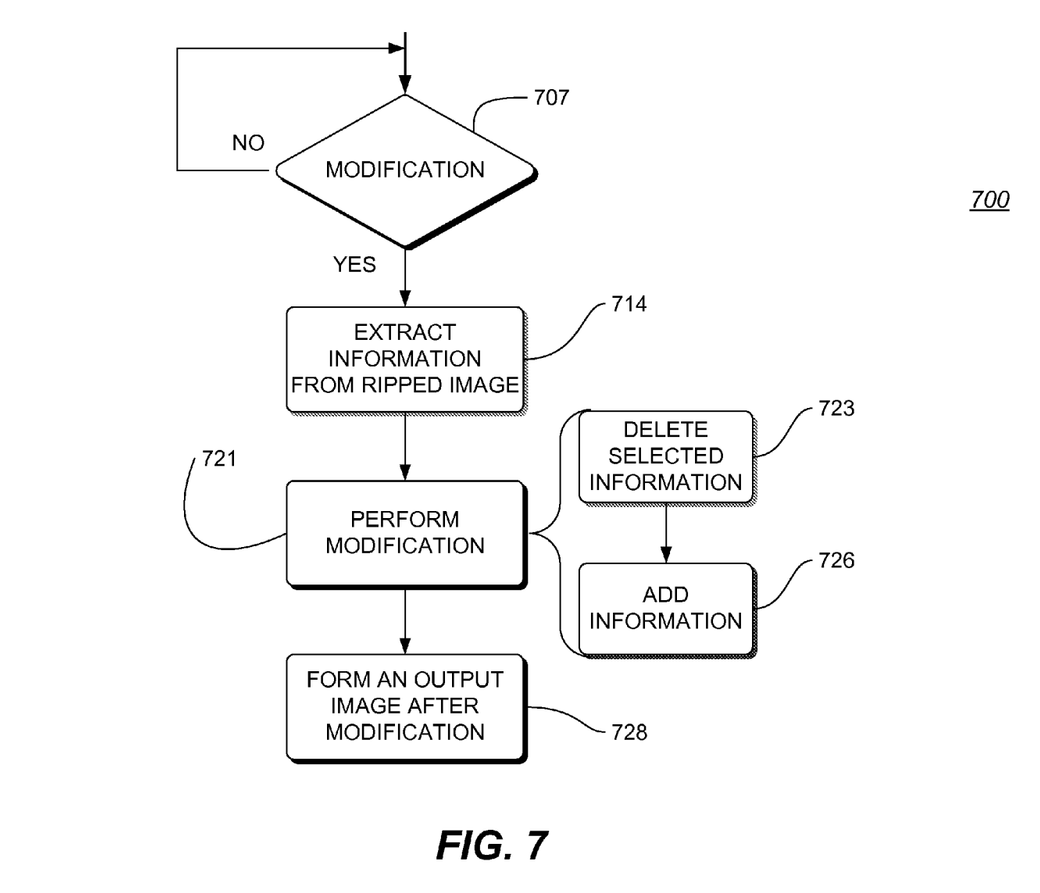
FIG. 7 is a flow chart of a method to modify a RIPped image in a document processing system in accordance to an embodiment.

FIG. 7 is a flow chart of a method 700 to modify a RIPped image in a document processing system in accordance to an embodiment. Method 700 begins with action 707 which senses whether a modification of an at least one RIPped image has been selected. Action 707 senses such a modification by receiving a request from a user through keyboard 405 or user interface 10, or by receiving an indication from print server interface 505 that a selection of one of the modification choices 520-535 has been made. If a modification is not detected in action 707 then method 700 restarts and waits for modification to be selected. When a modification is sensed in action 707 control passes to action 714 for further processing. In action 714, method 700 extracts information from RIPped image 210 as outlined above in FIG. 3. After extracting the information 714 control is passed to action 721 where modification is performed on certain segments or objects. Action 721 will perform deletion of selected information 723, adding information 726, or other processing as discussed with reference to modification processor 307 in FIG. 3. After modification, in action 728 a print image is formed that incorporates the modification of action 721. Action 728 forms an output/print image that is suitable for printing by a print engine.

Embodiments as disclosed herein may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method to manage at least one RIPped image having control and/or identification information during job workflow before printing comprising:
   receiving at least one RIPped image that can be reproduced by a printing engine, wherein the at least one RIPped image comprises an image and data indicating at least one of location, shape, and orientation of objects or components;
   displaying a print server interface with individual panes showing active, paused, and completed print jobs, wherein the pane showing the active print jobs comprises the received at least one RIPped image;
   determining if a user through a keyboard or user interface, or by receiving an indication from the print server interface has selected a RIPped image for modification;
   displaying a modification processing user interface with menus to facilitate user changes to the selected RIPped image;
   sensing the user changes to the control and/or identification information in the selected RIPped image;
   performing modification processing based on the user changes to the selected RIPped image by:
   decomposing with a segmenter the selected RIPped image into individual pages that are then segmented into the components or the objects to extract information contained therein;
   processing coded symbology and then erasing the processed coded symbology;
   processing modification of the control and/or identification information in the selected RIPped image and then for each page of the selected RIPped image extracting the control and/or identification information from the selected RIPped image to alter the segments or objects based on the sensed user changes;
   forming an output bitmap image after modification of the selected RIPped image;
   wherein the modification comprises adding a security feature, adding tracking information, and voiding an active print job.

2. The method of claim 1, wherein the modification is selected from a group comprising of deleting extracted information, deleting extracted information and adding additional information, adding additional information, and/or embedding a control instruction in the selected RIPped image.

3. The method of claim 2, wherein the output bitmap image has a format compatible with one of Tagged-Image File Format (TIFF), Joint Photographic Experts Group (JPEG), Portable Network Graphics (PNG), Windows Bitmap (BMP), Exchangeable image file format (EXIF), Windows Media Photo (WMP), raw image format (RAW).

4. The method of claim 2, wherein adding additional information is selected from a group comprising of operator identification (ID) information, printer identification (ID) information, time stamp information, watermark, tracking information, security feature and/or data specific to a user's application.

5. The method of claim 2, wherein the at least one RIPped image comprises at least one of a barcode, a glyph, text, and an image.

6. A print server for implementation by at least one machine for processing a job workflow, the print workflow server comprising:
   a processor to receive at least one RIPped image that can be reproduced by a printing engine and to execute instructions for processing the job workflow and to sense whether a modification of the at least one RIPped image has been selected, wherein the at least one RIPped image comprises at least one image and data indicating at least one of location, shape, and orientation of objects or components; and
   an interface to connect to the print workflow server so as to receive a modification print instruction;
   wherein the processor when coupled to a storage device with instructions operative on the processor to manage the at least one RIPped image by:
   causing to be display a print server interface with individual panes showing active, paused, and completed print jobs, wherein the pane showing the active print jobs comprises the received at least one RIPped image;
   determining if a user through a keyboard or user interface, or by receiving an indication from the print server interface has selected a RIPped image for modification;
   performing modification processing on the selected RIPped image by:
   causing to be display of a user interface with menus to facilitate user changes to the selected RIPped image;
   receiving the user changes that when processed causes the processor to extract information from the selected RIPped image and to modify the selected RIPped image;
   wherein the processor executes instructions for processing some coded symbology on the selected RIPped image and then erasing the processed coded symbology;
   in response to the user changes decomposing the selected RIPped image into individual pages that are then segmented into components or objects to extract information contained therein;
   in response to the user changes for each page extracting control and/or identification information from the selected RIPped image and performing modification of the segments or objects;
   in response to the modification of the segments or objects forming an output bitmap image of the selected RIPped image.

7. The print server of claim 6, the executed instructions causing the processor to facilitate printing of a document when receiving a print command for printing from a user by:
   receiving a print command for printing the document;
   displaying a print user interface with selectable settings and selectable modification settings that form part of the modification print instructions;
   receiving an indication from the user of selected settings and modification settings; and
   controlling the at least one machine using the selected settings and modification settings.

8. The print server of claim 7, wherein a modification setting is selected from a group comprising of deleting extracted information, deleting extracted information and adding additional information, adding additional information, embedding a control instruction in the selected RIPped image.

9. The print server of claim 8, wherein the output bitmap image has a format compatible with one of Tagged-Image File Format (TIFF), Joint Photographic Experts Group (JPEG), Portable Network Graphics (PNG), Windows Bitmap (BMP), Exchangeable image file format (EXIF), Windows Media Photo (WMP), raw image format (RAW).

10. The print server of claim 8, wherein adding additional information is selected from a group comprising of operator identification (ID) information, printer identification (ID) information, time stamp information, watermark, tracking information, security feature, and/or data specific to a user's application.

11. The print server of claim 8, wherein the at least one RIPped image comprises at least one of a barcode, a glyph, text, and an image.

12. An apparatus for controlling print processing of a document having at least one RIPped image, comprising:
a processor; and
a storage device coupled to the processor, wherein the storage device contains instructions operative on the processor for:
receiving at least one RIPped image that can be reproduced by a printing engine, wherein the at least one RIPped image comprises at least one image and data indicating at least one of location, shape, and orientation of objects or components;
displaying a print server interface with individual panes showing active, paused, and completed print jobs, wherein the pane showing the active print jobs comprises the received at least one RIPped image;
determining if a user through a keyboard or user interface, or by receiving an indication from the print server interface has selected a RIPped image for modification;
performing modification processing on the selected RIPped image by:
displaying a print user interface having menus to facilitate at least one selectable change to the selected RIPped image;
sensing selection of the at least one selectable change;
extracting information from the selected RIPped image if it is sensed that a selection of the at least one selectable change has been made, wherein the extracting is decomposing the selected RIPped image into individual pages that are then segmented into components or objects to extract information contained therein; and
applying the at least one selectable change to the document;
processing some coded symbology on the selected RIPped image and then erasing the processed coded symbology;
forming an output bitmap image after modification of the selected RIPped image.

13. The apparatus of claim 12, further comprising:
wherein the modification is selected from a group comprising of deleting extracted information, deleting extracted information and adding additional information, adding additional information, embedding a control instruction in the selected RIPped image;
wherein the output bitmap image has a format compatible with one of Tagged-Image File Format (TIFF), Joint Photographic Experts Group (JPEG), Portable Network Graphics (PNG), Windows Bitmap (BMP), Exchangeable image file format (EXIF), Windows Media Photo (WMP), raw image format (RAW).

14. The apparatus of claim 13, wherein adding additional information is selected from a group comprising of operator identification (ID) information, printer identification (ID) information, time stamp information, watermark, tracking information, security feature.

15. The apparatus of claim 13, wherein the at least one RIPped image comprises at least one of a barcode, a glyph, text, and an image.

16. The apparatus of claim 12, further comprising:
processing coded symbology and then erasing the processed coded symbology;
wherein the modification is selected from a group comprising of deleting extracted information, deleting extracted information and adding additional information, adding additional information, embedding a control instruction in the at least one RIPped image;
wherein the output bitmap image has a format compatible with one of Tagged-Image File Format (TIFF), Joint Photographic Experts Group (JPEG), Portable Network Graphics (PNG), Windows Bitmap (BMP), Exchangeable image file format (EXIF), Windows Media Photo (WMP), raw image format (RAW).

* * * * *